(12) United States Patent
Jeong

(10) Patent No.: US 8,100,680 B2
(45) Date of Patent: Jan. 24, 2012

(54) APPARATUS FOR MANUFACTURING FLOOR MAT USING DOUBLE CONVEYOR SYSTEM

(76) Inventor: Yong Chae Jeong, Busan (KR)

( * ) Notice: Subject to any disclaimer, the term of this patent is extended or adjusted under 35 U.S.C. 154(b) by 68 days.

(21) Appl. No.: 12/596,352

(22) PCT Filed: Apr. 8, 2008

(86) PCT No.: PCT/KR2008/001988
§ 371 (c)(1),
(2), (4) Date: Oct. 16, 2009

(87) PCT Pub. No.: WO2008/127008
PCT Pub. Date: Oct. 23, 2008

(65) Prior Publication Data
US 2010/0129481 A1   May 27, 2010

(30) Foreign Application Priority Data
Apr. 16, 2007   (KR) .......................... 10-2007-0036913

(51) Int. Cl.
*B29C 43/48*   (2006.01)
(52) U.S. Cl. .......................... 425/115; 425/193; 425/371
(58) Field of Classification Search .................... 425/89, 425/115, 193, 335, 371
See application file for complete search history.

(56) References Cited

U.S. PATENT DOCUMENTS

| | | | | |
|---|---|---|---|---|
| 3,957,413 A | * | 5/1976 | Lieberman | 425/371 |
| 4,043,719 A | * | 8/1977 | Jones | 425/115 |
| 4,285,654 A | * | 8/1981 | Bohm et al. | 425/371 |
| 5,453,231 A | | 9/1995 | Douglas | |
| 5,908,596 A | | 6/1999 | Wilkins et al. | |

FOREIGN PATENT DOCUMENTS

| | | |
|---|---|---|
| JP | 01-247114 | 10/1989 |
| JP | 04-133704 | 5/1992 |
| JP | 2002-326243 | 11/2002 |
| KR | 10-1998-0020921 | 6/1998 |

\* cited by examiner

*Primary Examiner* — James Mackey
(74) *Attorney, Agent, or Firm* — Christopher Paul Mitchell

(57) ABSTRACT

The present invention relates to a double-conveyor type apparatus for manufacturing a floor mat adapted to be disposed on a floor surface in an operating room in an industrial site, in various buildings or vehicles, or in an office room or house so as to reduce the impact or load transmitted to a human body and to prevent the sliding thereon, wherein the double-conveyor type apparatus includes a double-conveyor system having upper and lower conveyors formed of a plurality of unit upper and lower molds standardized to a given size and in series connected to each other is operated to allow a material of the floor mat to be passed thereon, thereby manufacturing the floor mat, such that the mass production of the floor mat can be simply and rapidly achieved to enhance the productivity.

1 Claim, 3 Drawing Sheets

[Fig. 1]
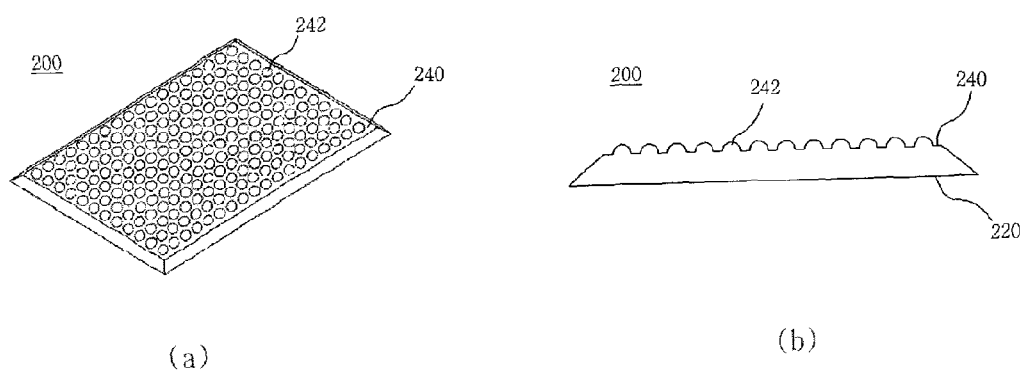
(a)　　　　　　　　　　　　　　(b)
[Fig. 2]
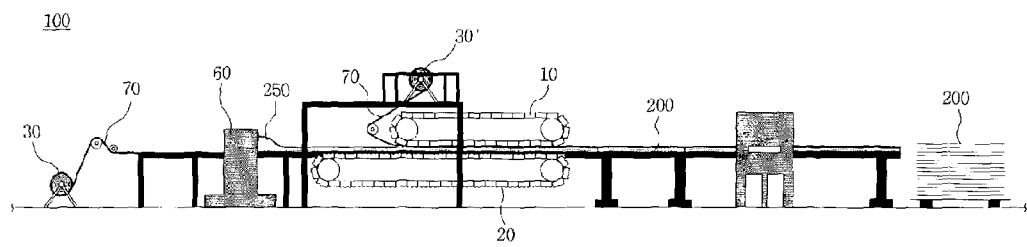

[Fig. 3]
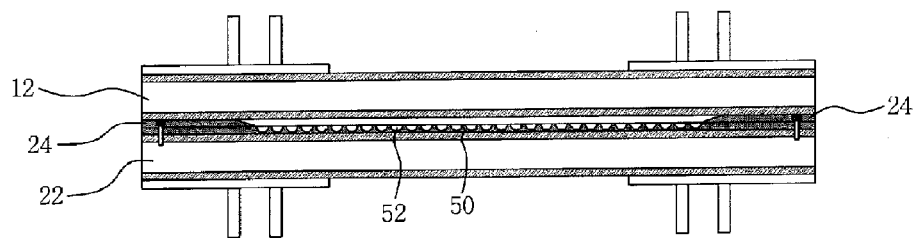
(a)
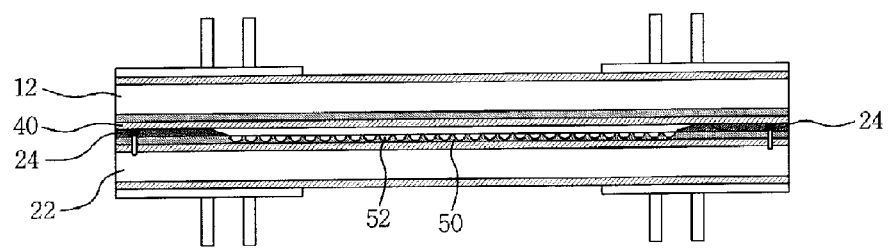
(b)
[Fig. 4]
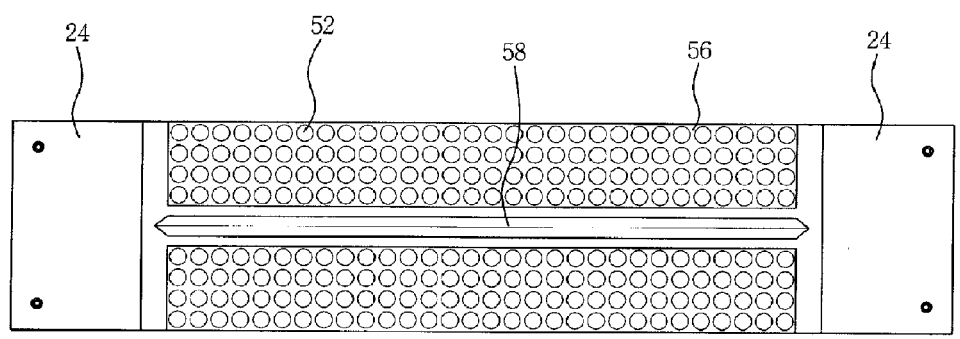

[Fig. 5]
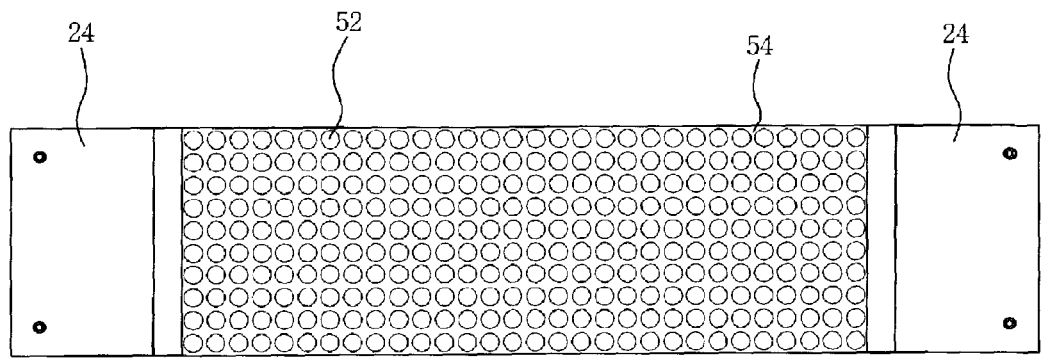
[Fig. 6]
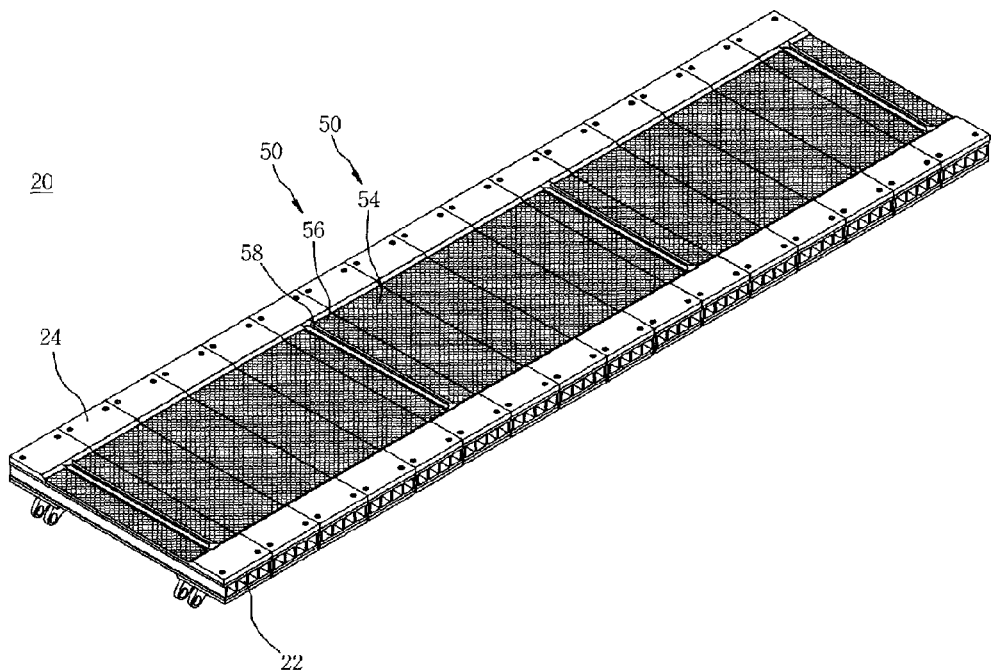

APPARATUS FOR MANUFACTURING FLOOR MAT USING DOUBLE CONVEYOR SYSTEM

RELATED APPLICATIONS

This application is a 371 application of International Application No. PCT/KR2008/001988, filed Apr. 8, 2008, which in turn claims priority from Korean Patent Application No. 10-2007-0036913, filed Apr. 16, 2007, both of which are incorporated herein by reference.

TECHNICAL FIELD

The present invention relates to a double-conveyor type apparatus for manufacturing a floor mat, and more particularly, to a double-conveyor type apparatus for manufacturing a floor mat, wherein a double-conveyor system having upper and lower conveyors formed of a plurality of unit upper and lower molds standardized to a given size and in series connected to each other is operated to allow a material of the floor mat to be passed thereon, thereby manufacturing the floor mat, such that the mass production of the floor mat can be simply and rapidly achieved to enhance the productivity, and wherein the combination of the plurality of unit upper and lower molds constituting the upper and lower conveyors is changed to allow the size of the floor mat to be easily varied.

BACKGROUND ART

A floor mat serves to effectively prevent the fatigue accumulation of a human body and the generation of pain on the bodily regions like knees, a waist and so on when a person stands to work for long hours on a floor surface in an operating room in an industrial site, in various buildings or vehicles, or in an office room or house, and it also serves to prevent the sliding accidents caused by liquid like water or oil flowing on a floor. The floor mat is formed of a polyurethane foam layer having a generally excellent shock-absorbing effect and has a plurality of protrusions formed on the top surface thereof at uniform intervals so as to provide an anti-sliding function.

As one prior art, Korean Utility Model Registration No. 20-0335549 entitled "Industrial safety mat" as filed by the same applicant as in the present invention is proposed wherein the industrial safety mat includes: a foam layer formed of polyurethane foam; and a surface layer formed of any one selected from synthetic rubber such as chloroprene rubber, nitrile rubber, hypalon rubber, acryl rubber, urethane rubber, fluoro rubber, and polysulfide rubber, thereby improving chemical resistance. As another prior art, Korean Utility Model Registration No. 20-0353544 entitled "Industrial fatigue prevention mat" is proposed wherein the industrial fatigue prevention mat includes: a foam layer formed of polyurethane foam; and a surface layer coupled on the top surface of the foam layer and formed of a transparent or translucent thermoplastic resin film having a printed layer formed on the inside surface thereof, thereby preventing the permeation of oil solution in the operating room into the mat and also providing a variety of shapes and colors on the surface layer thereof.

As yet another prior art, Korean Utility Model Registration No. 20-0336312 entitled, "kitchen mat" is proposed wherein the kitchen mat includes: a foam layer formed of polyurethane foam having a shore hardness value A in a range between 8 and 20 and a thickness in a range between 7.0 mm and 20.0 mm; and a surface layer formed of synthetic leather having a thickness in a range between 0.4 mm and 1.0 mm and bonded on the top surface of the foam layer, thereby preventing the generation of fatigue and easily achieving the designing.

Since the floor mats should be provided on the floor surface having a generally large area, they have a relatively large size, and thus, a foam material which is mixed by a mixing head is poured into a mold and then foamed and molded to make the floor mats.

In this case, as the size of the floor mat is large, the mold used in the production of the floor mat becomes larger, which raises the facility investment costs and also increases the defect rate. Further, when the size of the floor mat is further large, the production of the mold is impossible and the production of the floor mat is also impossible. Moreover, when it is desired to change the size of the floor mat, the existing mold should be exchanged with new one having a desired size, which needs additional costs.

According to such a conventional floor mat manufacturing apparatus, foam resin is poured intermittently in the mold and then foamed and molded. Next, the molded mat is moved from the mold to the outside, thereby finishing manufacturing the floor mat. As a result, the manufacturing time is relatively long and accordingly, the productivity is not high.

On the other hand, a variety of molding devices using a conveyor system which continuously conveys a material are proposed. The molding devices are disclosed in Korean Utility Model Publication No. 1996-0000480 entitled "Apparatus for manufacturing construction plate" in Korean Patent Laid-Open Publication No. 10-2006-0029320 entitled "Apparatus for manufacturing shock-absorbing mat utilizing waste tire and method of manufacturing the same" and in Korean Utility Model Publication No. 20-021 1701 entitled "Apparatus for continuously molding rubber mat"

According to the prior arts, the apparatus for manufacturing a construction plate includes: supply means for receiving synthetic cement mortar from a pipe on the top side of a conveyor adapted to convey the plate, and having a pair of rotary rollers mounted on the inside lower portion thereof; tamping means having a tamping edge adapted to be inserted into a guide member in such a manner as to be reciprocated upwardly and downwardly by means of a connecting rod connected to an eccentric point of a disc rotating about an axis; and a vibrating roller adapted to be vibrated in upward and downward directions.

According to the prior arts, the apparatus for manufacturing a shock-absorbing mat utilizing a waste tire, which is disposed on a living room floor in the apartment construction, includes: an endless track lower mold adapted to be moved horizontally by a driving gear in a body and having a plurality of "D"-shaped lower mold members connected by means of a connection rod, each lower mold member having an electrical heater mounted thereon; a cylindrical upper mold adapted to be cooperated with the endless track lower mold in such a manner as to be spaced apart from the endless track lower mold by a given distance and having an electrical heater mounted thereon; an underside-coating sheet supply roller adapted to supply an underside-coating sheet to the endless track lower mold; a supply hopper adapted to supply waste tire rubber chips mixed with a plasticizer; an upper net-shaped sheet supply roller adapted to supply an upper net-shaped sheet; and a refinement roller adapted to uniformly refine the waste tire rubber chips mixed with the plasticizer supplied to the underside-coating sheet.

According to the prior arts, the apparatus for continuously molding a rubber mat, which unrolls a roll type carpet from a conveyor, while being bonding to a rubber pad formed of activated powder, and molds a plurality of protrusions on the rubber pad, includes: a calendar adapted to mold the rubber pad formed of the activated powder being supplied from a mixer to a thin mat; a heater disposed below the calendar so as to maintain the rubber pad to a predetermined constant temperature in the state where the rubber pad is bonded to the carpet; a molding roller disposed below the heater so as to continuously mold the plurality of protrusions on one surface of the rubber pad; a heat chamber disposed below the molding roller so as to allow the rubber pad to be vulcanized; and a cooling roller disposed blow the heat chamber so as to rapidly cool the rubber pad and the carpet and to wound them onto a roll.

According to the apparatus for molding the rubber mat by using the conveyor system, since the conveyor system is continuously operated, a large quantity of products can be made rapidly, thereby increasing the productivity. Therefore, there is a need for the development of an apparatus for manufacturing a floor mat by using such a conveyor system to enhance the productivity of the floor mat.

DISCLOSURE OF INVENTION

Technical Problem

Accordingly, the present invention has been made to solve the above problems occurring in the prior arts, and it is an object of the present invention to provide a new double-conveyor type apparatus for manufacturing a floor mat, wherein a double-conveyor system having upper and lower conveyors formed of a plurality of unit upper and lower molds standardized to a given size and in series connected to each other is operated to allow a material of the floor mat to be passed thereon, thereby manufacturing the floor mat, such that the mass production of the floor mat can be simply and rapidly achieved to enhance the productivity.

It is another object of the present invention to provide a new double-conveyor type apparatus for manufacturing a floor mat, wherein the combination of a plurality of unit upper and lower molds constituting upper and lower conveyors is changed to allow the size of the floor mat to be easily varied.

Technical Solution

To achieve the above objects, there is provided a double-conveyor type apparatus for manufacturing a floor mat formed of foam resin having excellent elasticity and standardized to a given size such that an underside surface of the floor mat is formed in a flat shape so as to come into close contact with each floor surface of a variety of buildings and a top surface of the floor mat has a plurality of protrusions formed thereon so as to prevent sliding thereon, the double-conveyor type apparatus including: a plurality of unit upper molds each having a flat surface formed thereon so as to mold the flat underside surface of the floor mat and adapted to be in series connected to each other to form an upper conveyor; a plurality of unit lower molds each having a plurality of concave grooves formed thereon so as to mold the top surface of the floor mat having the plurality of protrusions formed thereon and adapted to be in series connected to each other to form a lower conveyor; and an uncoiler disposed at the front of each of the upper and lower conveyors so as to continuously supply a mat attachment film to the surface of each of the upper and lower conveyors, wherein the foam resin is supplied to the front end portion of the lower conveyor and conveyed to the space between the surfaces of the upper and lower conveyors by means of the mat attachment film being supplied from the uncoiler so as to be foamed to thereby continuously produce the floor mat.

Advantageous Effects

According to the present invention, the double-conveyor type apparatus for manufacturing a floor mat is provided wherein a double-conveyor system having upper and lower conveyors formed of a plurality of unit upper and lower molds standardized to a given size and in series connected to each other is operated to allow a material of the floor mat to be passed thereon, thereby manufacturing the floor mat, such that the mass production of the floor mat can be simply and rapidly achieved to enhance the productivity. Also, the double-conveyor type apparatus for manufacturing a floor mat is provided wherein the combination of the plurality of unit upper and lower molds constituting the upper and lower conveyors is changed to allow the size of the floor mat to be easily varied.

BRIEF DESCRIPTION OF THE DRAWINGS

FIGS. 1a and 1b is a perspective view showing the floor mat manufactured by a double-conveyor type apparatus for manufacturing a floor mat according to the present invention.

FIG. 2 is a schematic sectional view showing a double-conveyor type apparatus for manufacturing a floor mat according to the present invention.

FIGS. 3a and 3b are front sectional views showing the double-conveyor type apparatus for manufacturing a floor mat according to the present invention.

FIG. 4 is a plan view showing a first type unit lower mold constituting a lower conveyor in the double-conveyor type apparatus for manufacturing a floor mat according to the present invention.

FIG. 5 is a plan view showing a second type unit lower mold constituting the lower conveyor in the double-conveyor type apparatus for manufacturing a floor mat according to the present invention.

FIG. 6 is a partly detailed view showing the lower conveyor in the double-conveyor type apparatus for manufacturing a floor mat according to the present invention. Best Mode for Carrying Out the Invention Hereinafter, an explanation on a double-conveyor type apparatus for manufacturing a floor mat according to the present invention will be given with reference to FIGS. 1 to 6, wherein the parts performing the same functions in FIGS. 1 to 6 are indicated by corresponding reference numerals. On the other hand, no illustration and explanation on the configuration and operation of an apparatus for manufacturing a floor mat easily appreciated in those skilled in the art will exist in the attached drawings and the description of the invention. In the attached drawings and the description of the invention, especially, the detailed technical configuration and operation on the parts not directly related to the technical features of this invention will not be described, and only the technical configuration related to this invention will be simply illustrated or explained. Further, in the attached drawings, the size ratios among the parts are a little different or the sizes of the assembled parts are different from each other, but since the differences in the drawings are easily understood by those skilled in the art, an explanation on them will be avoided in the description of this invention.

FIG. 1 is a perspective view showing the floor mat manufactured by a double-conveyor type apparatus for manufacturing a floor mat according to the present invention, FIG. 2 is a schematic sectional view showing a double-conveyor type apparatus for manufacturing a floor mat according to the present invention, FIGS. 3a and 3b are front sectional views showing the double-conveyor type apparatus for manufacturing a floor mat according to the present invention, FIG. 4 is a plan view showing a first type unit lower mold constituting a lower conveyor in the double-conveyor type apparatus for manufacturing a floor mat according to the present invention, FIG. 5 is a plan view showing a second type unit lower mold constituting the lower conveyor in the double-conveyor type apparatus for manufacturing a floor mat according to the present invention, and FIG. 6 is a partly detailed view showing the lower conveyor in the double-conveyor type apparatus for manufacturing a floor mat according to the present invention.

According to the present invention, a double-conveyor type apparatus for manufacturing a floor mat includes upper and lower conveyors 10 and 20 constituting a double-conveyor system and uncoilers 30 and 30 disposed at the front of the upper and lower conveyors 10 and 20. A floor mat 200 to be manufactured according to the present invention is standardized to a given size and is formed of foam resin 250 having excellent elasticity. The floor mat 200 has a flat underside surface 220 adapted to come into close contact with the floor surfaces of a variety of buildings and an upper surface 240 having a plurality of protrusions 242 formed thereon so as to prevent sliding thereon.

A technical feature of the double-conveyor type apparatus for manufacturing the floor mat 200 according to the present invention is to provide the upper and lower conveyors 10 and 20 that are made of a plurality of unit upper and lower molds adapted to be in series connected to each other so as to mold the floor mat 200.

In the double-conveyor type apparatus for manufacturing the floor mat according to the present invention, the upper and lower conveyors 10 and 20 function to convey the foam resin 250 as the material of the floor mat 200 and at the same time to mold the foam resin 250 to the floor mat 200.

The upper and lower conveyors 10 and 20 form the upper and lower molds of a mold for molding the floor mat 200, and according to the entire shape of the floor mat 200, one floor mat 200 may be molded by means of one upper mold and one lower mold. Alternately, one floor mat 200 is equally divided to make a plurality of unit upper molds 40 and a plurality of unit lower molds 50 standardized correspondingly to the divided shapes, and thus, the plurality of unit upper molds 40 and the plurality of unit lower molds 50 are combined to mold one floor mat 200.

In the double-conveyor type apparatus 100 for manufacturing the floor mat 200 according to the present invention, the plurality of unit upper molds 40 and the plurality of unit lower molds 50 which are standardized correspondingly to the divided shapes of one floor mat 200 are combined to form the mold corresponding to one floor mat 200. The formation of the unit upper molds 40 and the unit lower molds 50 is desirable when it is desired to extend the size of the floor mat 200, and as the number of unit upper molds 40 and unit lower molds 50 is increased or decreased, the size of the floor mat 200 is adjustable.

That is, the unit upper molds 40 and the unit lower molds 50 which are standardized to given size and shape are assembled to form the mold for molding one floor mat 200, and therefore, since the number of unit upper molds 40 and unit lower molds 50 is adjusted, the size of the floor mat 200 is also adjustable.

In the double-conveyor type apparatus 100 for manufacturing the floor mat 200 according to the present invention, the flat underside surface 220 of the floor mat 200 is molded by means of the upper conveyor 10, and the upper surface 240 of the floor mat 200 having the plurality of protrusions 242 formed thereon is molded by means of the lower conveyor 20.

The upper conveyor 10, by which the flat underside surface 220 of the floor mat 200 is molded, is formed of the plurality of unit upper molds 40 each having a flat plate-like shape are connected serially to each other, and the lower conveyor 20, by which the upper surface 240 of the floor mat 200 having the plurality of protrusions 242 formed thereon is molded, is formed of the plurality of unit lower molds 50 each having a plurality of concave grooves 52 having a corresponding shape to the shape of the protrusions 242 are connected serially to each other.

The unit upper molds 40 and the unit lower molds 50 are coupled to one surfaces of slat plates 12 and 22 functioning as the frames of the upper and lower conveyors 10 and 20, as shown in FIG. 3b, and since the unit upper molds 40 have the flat plate-like shape, there is no need to provide a separate mold as shown in FIG. 3a. Therefore, the flat surface of the slat plate 12 may function as the unit upper molds 40.

In order to mold the sides of the foam resin 250 poured into the space between the upper and lower conveyors 10 and 20, further, a side plate 24 is formed on the both side portions of the space between the upper and lower conveyors 10 and 20, while coming into contact with the upper and lower conveyors 10 and 20, and the side plate 24 is detachably fixed to the upper conveyor 10 or the lower conveyor 20.

The unit upper molds 40 and the unit lower molds 50 are coupled to each other in various manners so as to form the upper and lower conveyors 10 and 20, which is disclosed in Korean Patent Publication No. 10-2006-0029320 entitled "Apparatus for manufacturing shock-absorbing mat utilizing waste tire and method for manufacturing the same" as mentioned above.

The foam resin 250 forming the floor mat 200 is poured in a liquid state into the space between the upper and lower conveyors 10 and 20 and is conveyed by them. During this process, the foam, resin 250 is gradually foamed and molded to the floor mat 200 by means of the upper and lower conveyors 10 and 20.

In this case, since the floor mat 200 that is conveyed and molded by means of the upper and lower conveyors 10 and 20 is a continuous body that is not divided into individual bodies having a given size, it should be divided into a plurality of unit bodies in accordance with a given size of the floor mat 200.

In order to perform the dividing operation, each unit lower mold 50 of the lower conveyor 20 has two types unit lower molds, that is, a first type unit lower mold 54 having a plurality of concave grooves 52 formed on the surface thereof, and a second type unit lower mold 56 having an end portion-forming horizontal bar 58 protruded in a width direction along the center of the surface on which the plurality of concave grooves 52 are formed, so as to mold the shapes of the front and back end portions of the floor mat 200.

In this case, the end portion-forming horizontal bar 58 is protruded to have a relatively lower height than the distance between the upper and lower conveyors 10 and 20, such that the foam resin 250 is passed through the end portion-forming horizontal bar 58 and is continuously foamed and molded. Since the floor mat 200 is molded slantly along the end portion-forming horizontal bar 58, the front and back end portions of the floor mat 200 are formed. Hence, the floor mat 200 is divided in shape into the plurality of bodies, and after the post-processing the floor mats each having the given length can be easily separated from each other.

Further, the side plates 24 are formed on the both side portions of the space between the upper and lower conveyors 10 and 20 in such a manner as to come into contact with the upper and lower conveyors 10 and 20, while being detachably fixed to the upper conveyor 10 or the lower conveyor 20, and therefore, when it is desired to adjust the length in left and right directions of the floor mat 200, the side plates 24 are exchanged with those having different lengths and detachably fixed to either the upper conveyor 10 or the lower conveyor 20.

Further, when the number of the first type unit lower molds 54 arranged between the two type unit lower molds 56 is adjusted, the length in the forward and backward directions of the floor mat 200 can be adjusted.

In this case, the horizontal bar 58 of each second type unit lower mold 56 may have a cutter formed in a width direction thereof in such a manner as to be connected to a driving actuator, and as the cutter is momentarily raised from the surface of the horizontal bar 58 at given time intervals during the actuating process of the upper and lower conveyors 10 and 20 and is passed through the soft foam resin 250 to come into close contact with the upper conveyor 10, thereby cutting the floor mat 200 being conveyed as a continuous body to a given length.

In the double-conveyor type apparatus 100 for manufacturing the floor mat 200 according to the present invention, the foam resin 250, which is passed through the space between the upper and lower conveyors 10 and 20 and is foamed and molded, is
supplied initially in a liquid state, such that during the molding process, the foam resin 250 may leak to the interior of the unit upper molds or the unit lower molds of the upper and lower conveyors 10 and 20, thereby causing the malfunction of the unit upper molds or the unit lower molds. In order to prevent this leakage of the foam resin 250, thus, the double-conveyor type apparatus 100 for manufacturing the floor mat 200 according to the present invention is provided with uncoilers 30 and 30 disposed at the front side of the upper and lower conveyors 10 and 20 and each having a mat attachment film 70 wound thereon, the mat attachment film 70 being chiefly used with a TPU film.

The mat attachment film 70 is continuously spread and supplied from each of the uncoilers 30 and 30 to the upper and lower conveyors 10 and 20, and the foam resin 250 is supplied between the films 70 spread on the surfaces of the upper and lower conveyors 10 and 20. The foam resin 250 is brought into close contact with the unit upper molds and unit lower molds of the upper and lower conveyors 10 and 20 by means of the mat attachment films 70, thereby preventing the foam resin 250 from leaking to the unit upper molds and the unit lower molds of the upper and lower conveyors 10 and 20.

Like this, the films 70 are attached on the upper and underside surfaces of the floor mat 200 formed of the foam resin 250, and when manufacturing the floor mat 200 is finished, desirably, the film 70 attached on the underside surface 220 of the floor mat 200 is separated to allow the floor mat to be gently attached on the floor surface in the operating room or in a building. The film 70 attached on the upper surface 240 of the floor mat 200 remains to allow the top surface of the floor mat 200 to be protected from the outside damages, such a film 70 adapted to be attached on the floor mat is in detail described in Korean Utility Model Registration No. 20-0353544 entitled "Industrial fatigue prevention mat" as filed by the same applicant as in the present invention.

The double-conveyor type apparatus 100 for manufacturing the floor mat 200 according to the preferred embodiment of the present invention is illustrated in FIG. 2 wherein the uncoiler 30 on which the mat attachment film 70 adapted to be supplied to the surface of the lower conveyor 20 is wound is disposed at the front end of the apparatus, and the foam resin supply device 60 is disposed at a position spaced apart from the uncoiler 30 by a given distance so as to supply the foam resin 250. Moreover, the lower conveyor 20 is disposed in vicinity of the foam resin supply device 60 so as to convey the foam resin 250 being supplied from the foam resin supply device 60.

The upper conveyor 10 is disposed over the lower conveyor 20 in such a manner as to be spaced apart from the lower conveyor 20 by the same distance as the thickness of the floor mat 200, and the uncoiler 30 on which the mat attachment film 70 adapted to be supplied to the surface of the upper conveyor 10 is wound is disposed over the front end of the upper conveyor 10.

The foam resin 250 being supplied to the lower conveyor 20 is conveyed between the upper and lower conveyors 10 and 20 by means of the mat attachment film 70 and is supplied and foamed to the space between the upper and lower conveyors 10 and 20 to mold the plurality of protrusions 242 forming the top surface of the floor mat 200, thereby completely making the standardized floor mat 200.

Since the conveying and molding are at the same time performed by the double-conveyor system where the upper and lower conveyors 10 and 20 are provided, the floor mat 200 can be easily and rapidly made to improve the productivity thereof.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

In the double-conveyor type apparatus for manufacturing the floor mat according to the present invention, each unit lower mold of the lower conveyor has two types unit lower molds, that is, a first type unit lower mold having a plurality of concave grooves formed on the surface thereof, and a second type unit lower mold having an end portion-forming horizontal bar protruded in a width direction along the center of the surface on which the plurality of concave grooves are formed, so as to mold the shapes of the front and back end portions of the floor mat, such that when the number of the first type unit lower molds arranged between the two type unit lower molds is adjusted, the length in the forward and backward directions of the floor mat can be adjusted.

The double-conveyor type apparatus for manufacturing the floor mat according to the present invention is proposed to produce the floor mat adapted to be disposed on a floor surface in an operating room of an industrial site, in various buildings or vehicles or in an office room or house, in large quantity, so as to prevent the fatigue accumulation of a human body and to prevent the generation of musculoskeletal pain on the human body. In the double-conveyor type apparatus for manufacturing the floor mat, the double-conveyor system having the upper and lower conveyors formed of the plurality of unit upper and lower molds standardized to a given size and in series connected to each other is operated to allow a material of the floor mat to be passed thereon, thereby manufacturing the floor mat. That is, the double-conveyor system where the upper and lower conveyors are provided at the same time perform the functions as the mold and the conveyor, such that the floor mat can be easily and rapidly produced to improve the productivity thereof. Further, the combination of the plurality of unit upper and lower molds constituting the upper and lower conveyors is changed to allow the size of the floor mat to be easily varied. Industrial Applicability As described above, the present invention relates to the double-conveyor type apparatus for manufacturing a floor mat, and more particularly, to the double-conveyor type apparatus for manufacturing a floor mat, wherein the double-conveyor system having the upper and lower conveyors formed of the plurality of unit upper and lower molds standardized to a given size and in series connected to each other is operated to allow a material of the floor mat to be passed thereon, thereby manufacturing the floor mat, such that the mass production of the floor mat can be simply and rapidly achieved to enhance the productivity, and wherein the combination of the plurality of unit upper and lower molds constituting the upper and lower conveyors is changed to allow the size of the floor mat to be easily varied.

The invention claimed is:

1. A double-conveyor type apparatus for manufacturing a floor mat formed of foam resin having excellent elasticity and standardized to a given size such that a flat underside surface of the floor mat comes into close contact with each floor surface of a variety of buildings and a top surface of the floor mat having a plurality of protrusions formed thereon is adapted to prevent sliding thereon, the double-conveyor type apparatus comprising:

a plurality of unit upper molds each having a flat surface adapted to be in series connected to each other to form an upper conveyor, so as to mold the flat underside surface of the floor mat;

a plurality of unit lower molds each having a plurality of concave grooves formed thereon adapted to be in series connected to each other to form a lower conveyor, so as to mold the top surface of the floor mat having the plurality of protrusions formed thereon; and an uncoiler disposed at the front of each of the upper and lower conveyors so as to continuously supply a mat attachment film to the surface of each of the upper and lower conveyors, wherein the foam resin is supplied to a front end portion of the lower conveyor and conveyed to a space between the surfaces of the upper and lower conveyors by means of the mat attachment film being supplied from the uncoiler, and while conveyed, the foam resin is foamed and molded to continuously produce the floor mat, wherein each unit lower mold of the lower conveyor is of two styles of unit lower molds, that is, a first style unit lower mold having the plurality of concave grooves formed on the surface thereof, and a second style unit lower mold having an end portion-forming horizontal bar protruded in a width direction along the center of the surface on which the plurality of concave grooves are formed, so as to mold shapes of front and back end portions of the floor mat, such that when the number of the first style unit lower molds arranged between the second style of unit lower molds is adjusted, the length in the forward and backward directions of the floor mat is adjusted.

* * * * *